(12) United States Patent
Pianykh et al.

(10) Patent No.: US 6,661,925 B1
(45) Date of Patent: Dec. 9, 2003

(54) FUNCTIONAL SET COMPRESSION (75) Inventors: Oleg S. Pianykh, Baton Rouge, LA (US); John M. Tyler, Baton Rouge, LA (US)

(73) Assignee: Board of Supervisors of Louisiana State University & Agricultural & Mechanical College, Baton Rouge, LA (US)

( * ) Notice: Subject to any disclaimer, the term of this patent is extended or adjusted under 35 U.S.C. 154(b) by 0 days.

(21) Appl. No.: 09/533,283

(22) Filed: Mar. 22, 2000

(51) Int. Cl.[7] .............................. G06K 9/36; G06K 9/00; H04N 7/12
(52) U.S. Cl. ....................... 382/239; 382/240; 382/238; 382/131; 375/240.11
(58) Field of Search ................................ 382/240, 248, 382/249, 238, 239, 232, 244, 130, 131, 128; 375/240.01, 240.11

(56) References Cited

U.S. PATENT DOCUMENTS

| | | | | |
|---|---|---|---|---|
| 4,827,336 A | * | 5/1989 | Acampora et al. | 375/240.01 |
| 5,014,134 A | | 5/1991 | Lawton | 358/261.3 |
| 5,235,420 A | * | 8/1993 | Gharavi | 375/240.11 |
| 5,321,776 A | | 6/1994 | Shapiro | 382/56 |
| 5,537,493 A | | 7/1996 | Wilkinson | 382/240 |
| 5,629,737 A | * | 5/1997 | Menez et al. | 375/240.11 |
| 5,777,678 A | * | 7/1998 | Ogata et al. | 375/240.11 |
| 5,883,978 A | | 3/1999 | Ono | 382/248 |

OTHER PUBLICATIONS

"Predictive coding schemes for subband image coders," Bamberger, R.H. et al., IEEE Proceedings of Energy and Information Technologies in the Southeast, Apr. 9–12, 1989, vol. 2, pp. 872–877.*

Oleg S. Pianykh; Lossless Set Compression of Correlated Information; 1994; Moscow.

* cited by examiner

*Primary Examiner*—Wenpeng Chen
(74) *Attorney, Agent, or Firm*—Jones, Walker, Waechter, Poitevent, Carrere & Denegre, LLP (57) ABSTRACT A method of compressing image data from a set of individual images wherein the images have a correlation between images of approximately greater than 0.5. A wavelet transform is applied to a reference image of the set in order to determine a series of reference coefficients $w_i^{(1)}$. The same wavelet transform is applied to an adjacent image of said set in order to determine another series of coefficients $w_i^{(2)}$. The series of coefficients $w_i^{(k-1)}$ and $w_i^{(k)}$ (for all $k \geq 2$) are then compared in order to determine a coefficient $b^{(k)}$ and a series of coefficients $c_i^{(k)}$, such that $w_i^{(k)}$ may be determined from the relationship $w_i^{(k)} = \lfloor b^{(k)} w_i^{(k-1)} \rfloor + c_i^{(k)}$. Alternatively, $b^{(k)}$ may be set equal to one rather than be determined. The coefficients for the reference image $w_i^{(1)}$, $b^{(k)}$ (if $b^{(k)}$ is not equal to one), and $c_i^{(k)}$ are then entropy encoded in order to form a compressed set of image data.

18 Claims, 4 Drawing Sheets

FUNCTIONAL SET COMPRESSION

I. BACKGROUND OF THE INVENTION

The present invention relates to methods and apparatuses for compressing data representing video or digital images. More specifically, the present invention relates to compressing data representing a set of images having a certain degree of similarity.

There are numerous areas of technology in which increasing volumes of image data must be processed and stored. This is particularly true with regard to medical radiological image data. The radiology department of a hospital may generate more than 500,000 digital images per year. One source estimates that a 1500-bed hospital may generate approximately 20 Terabytes of image data per year. Techniques for efficient classification, image processing, image database organization, and image transmission for analysis via telemedicine, have become important research areas.

The medical art has developed various Picture Archiving and Communication Systems (PACS) in an attempt to alleviate the problems associated with the creation of increasing volumes of medical image data. The functionality of most PACS is derived from the international Digital Imaging and Communication in Medicine (DICOM) standard. The DICOM standard specifies communications protocols, commands for image query and retrieval, storage standards, and similar parameters. However, prior art PACS still have many shortcomings. One serious disadvantage of conventional PACS is their insufficiency at reducing the large amounts of homogeneous data accumulating in radiological image databases. One method of reducing the amount of data in a database is to efficiently compress the image data prior to placing it in the database. Image data compression is also an important consideration in transferring the image from one location to another via network.

Typically, medical image data are compressed through conventional compression algorithms such as the standard Joint Photographic Experts Group (JPEG) algorithm. JPEG is presently the DICOM standard for data compression. JPEG utilizes Discrete Pulse Code Modulation (DPCM) for lossless and Discrete Cosine Transform (DCT) for lossy image compression. However, lossy compression is often avoided in medical imaging because of potential information loss, while lossless JPEG provides no means for compressing a series of similar images.

Alternate types of compression have been carried out with wavelet transforms. A wavelet transform decomposes a signal into a series of related waveforms similar to Fourier and DCT transforms decomposing a signal into a series of sine and cosine waveforms. The wavelet transform is based on a "scaling function" $\phi(x)$ and derived from it is a "mother wavelet" $\psi(x)$ satisfying the recursion relationship:

$$\phi(x) = \sum_k q_k \phi(2x-k), \quad (1a)$$

$$\psi(x) = \sum_k h_k \phi(2x-k), \quad (1b)$$

where constants $h_k$ uniquely define functions $\phi(x)$, $\psi(x)$ and constants $q_k$, and different choices of admissible $h_k$ (i.e. an $h_k$ for which a solution exists) produce different solutions to eqn. (1a) and eqn. (1b). Given $\psi(x)$, a basis of sub-band waveforms or wavelets is constructed as successive translations and dilations of the mother wavelet. Thus, each wavelet in the $\psi(x)$-generated wavelet basis is represented by the equation:

$$\psi_{j,k}(x) = 2^{j/2} \psi(2^j x - k), \quad (2)$$

where k represents the degree of translation and j represent the degree of dilation. When an image I(x) is transformed with wavelet $\psi(x)$, it is projected onto the v(x)-generated wavelet basis:

$$I(x) = \sum_{j,k} w_{j,k}(x) = \sum_{j,k} w_{j,k} 2^{j/2} \psi(2^j x - k), \quad (3)$$

where $w_{j,k}$ is the coefficient associated with each wavelet In signal compression (and particularly in image signals), the common use of integer precision requires the coefficients $w_{j,k}$ to be integers, which can be always achieved in eqn. (3) with "wavelet coefficient lifting." Wavelet coefficient lifting is well-known in the prior art as can be seen from publications such as "Wavelet Transforms that Map Integers to Integers" by R. C. Calderbank, Ingrid Daubechies, Wim Sweldens, and Boon-Lock Yeo, in "Applied and Computational Harmonic Analysis" (ACHA), Vol. 5, Nr. 3, pp. 332–369, 1998. The number of wavelets N representing an image is generally equal to the number of elements (e.g. pixels) making up the image. A less formal, but more convenient manner of representing the wavelet transform of an individual image I(x) is to use a single index i instead of index pairs (j,k):

$$I(x) = \sum_{i=1}^{N} w_i \psi_i(x), \quad (4)$$

where $\psi_i(x)$ still represents a particular wavelet, $w_i$ represents the wavelet coefficient associated with that wavelet, i is an integer from 1 to N, and the variable x represents each individual pixel position of the image.

Figure 1:
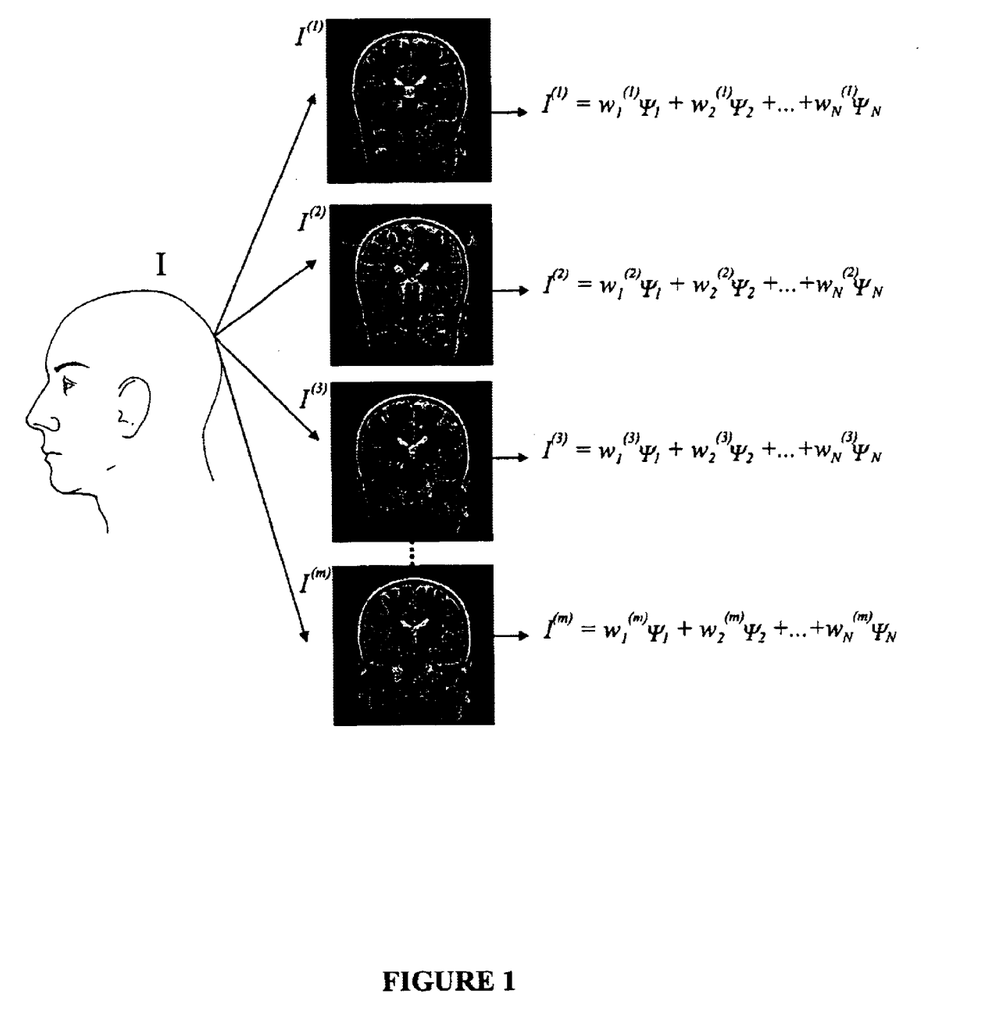
FIG. 1 is a conceptual representation of a series of brain scan images of a patient's head.

FIG. 1 illustrates conceptually a patient's head 1 and a series of horizontal brain CT images $I^{(1)}$, $I^{(2)}$, to $I^{(m)}$ taken therefrom. Each image may be represented by a wavelet equation such as equation (4). Thus, image $I^{(1)}$ may be represented as $I^{(1)} = w_1^{(1)} \psi_1 + w_2^{(1)} \psi_2 + \ldots + w_N^{(1)} \psi_N$, and image $I^{(m)}$ may be represented as $I^{(m)} = w_1^{(m)} \psi_1 + w_2^{(m)} \psi_2 + \ldots + w_N^{(m)} \psi_N$, as indicated in FIG. 1. Decomposing images into a wavelet transform with the above equations is well known in the art. One conventional software program which will determine the coefficients of an image for a given mother wavelet is MATLAB®, produced by The MathWorks, Inc. of 24 Prime Park Way, Natick, Mass. MATLAB® implements a "fast wavelet transform" technique which is well know in the art. The fast wavelet transform also orders the wavelet sub-bands in a sequence of lowest spatial frequency to highest spatial frequency. It will be understood that given the mother wavelet form and the wavelet coefficients $w_1, w_2, w_3 \ldots w_N$, the inverse transform may be applied and the original image reconstructed. However, transforming an image from the original pixel into the wavelet coefficient representation (eqn. (4)), often reduces redundant information typically present in images, thus providing the means for more compact image representation, i.e. compression. If the mother wavelet is known, the image is easily recovered from its wavelet coefficients with the inverse wavelet transform.

However, despite developments of new PACS and the introduction of wavelet transforms in data compression, the prior art has still failed to efficiently represent the inter-image informational redundancy that is usually present in any image database. This redundancy arises from the fact that radiological images typically comprise a set or "study" of different views or numerous "slices" of a particular organ. For example, a CT scan study of the brain may consist of approximately 150 vertical slices and approximate 30 horizontal slices. Each of these views or slices is a digital image requiring a significant number of bytes to represent: one view in an X-ray study of the chest may require as much as 10MB and thousands of such X-ray studies could be expected in a hospital's database.

It has been found that, statistically, the mean difference between images of the same organ in different individuals is much smaller than the difference between two unrelated images, such as images of two famous paintings. The lack of difference (or the similarity) of two images can be quantified by the correlation between the two images, where a correlation of zero reflects absolutely no similarity and a correlation of one reflects identical images. It was observed that the correlation between many images of the same organs, such as the brain or lungs, in different individuals will be at least between 0.50 and 0.90 and possibly higher than 0.90. Additionally, the correlation between different images of the same organ in a single study may also be between 0.50 and 0.90 and possibly higher than 0.90. Thus, there is a large set redundancy in a database containing thousands of chest X-ray images or CT scan brain images. It would constitute a significant advance in the art to provide a data compression technique which took advantage of these naturally occurring redundancies in radiological images and other similar sets of images.

It has also been discovered that particular transforms more closely approximate a set of similar images than other transforms. In particular, certain mother wavelets more accurately decompose a set of images of a given human organ than other mother wavelets. Thus, for a particular organ, e.g. the brain, a mother wavelet $\psi(x)$ having a particular set of constants $h_k$ in eqn. (1b) will better represent brain images than a mother wavelet having a different set of $h_k$. Those skilled in the art will recognize that data compression involving wavelet transformations will be more efficient if the compression routine utilizes a mother wavelet which more efficiently and more accurately decomposes the set of images being compressed.

II. OBJECTS OF THE INVENTION

It is an object of this invention to implement image data compression using wavelet transforms in a novel method and apparatus.

It is a further object of this invention to implement image data compression in a set of similar images by taking advantage of naturally recurring redundancies in the set of images.

Finally, it is an object of this invention to implement image data compression by utilizing a wavelet transform which closely represents the set of images being compressed.

III. SUMMARY OF THE INVENTION

Therefore, the present invention provides a method of compressing image data. The method includes providing a set of individual images wherein there is a correlation between images of approximately greater than 0.5. Many of the images of organs may have a correlation of between 0.5 and 0.9. A wavelet transform is applied to a reference image of the set in order to determine a series of reference coefficients $w_i^{(1)}$. The same wavelet transform is applied to an adjacent image of said set in order to determine another series of coefficients $w_i^{(2)}$. It is implied that a wavelet transform can be combined with "wavelet coefficient lifting" or truncation to a chosen coefficient precision. The series of coefficients $w_i^{(k-1)}$ and $w_i^{(k)}$ (for all $k \geq 2$) are then compared in order to determine a coefficient $b^{(k)}$ and a series of coefficients $c_i^{(k)}$, such that $w_i^{(k)}$ may be determined from the relationship $w_i^{(k)} = \lfloor b^{(k)} w_i^{(k-1)} \rfloor + c_i^{(k)}$. Alternatively, $b^{(k)}$ may beset equal to one rather than be determined. The coefficients for the reference image $w_i^{(1)}$, $b^{(k)}$ (if $b^{(k)}$ is not equal to one), and $c_i^{(k)}$ are then entropy encoded in order to form a compressed set of image data.

The present invention also provides an apparatus for compressing image data. The apparatus has a memory circuit capable of storing a set of images. There is also a wavelet transformation circuit which transforms the k-th image of the set into a series of wavelet coefficients $w_i^{(k)}$. Assuming $b^{(k)}$ is equal to one, a difference coefficient circuit determines the difference coefficient $d_i^{(k)}$ by subtracting a previous image wavelet coefficient $w_i^{(k-1)}$ from an adjacent image wavelet coefficient $w_i^{(k)}$. A still further circuit determines a value n such that $d_i^{(k)}$ is determined for all values of $1 < i < n$. Finally, an entropy encoding circuit encodes n, the coefficients $w_i^{(1)}$, $d_i^{(k)}$ for $1 < i < n$ and $w_i^{(k)}$ for $n < i < N$, thereby forming a compressed set of image data.

V. DETAILED DESCRIPTION OF THE INVENTION

Figure 2:
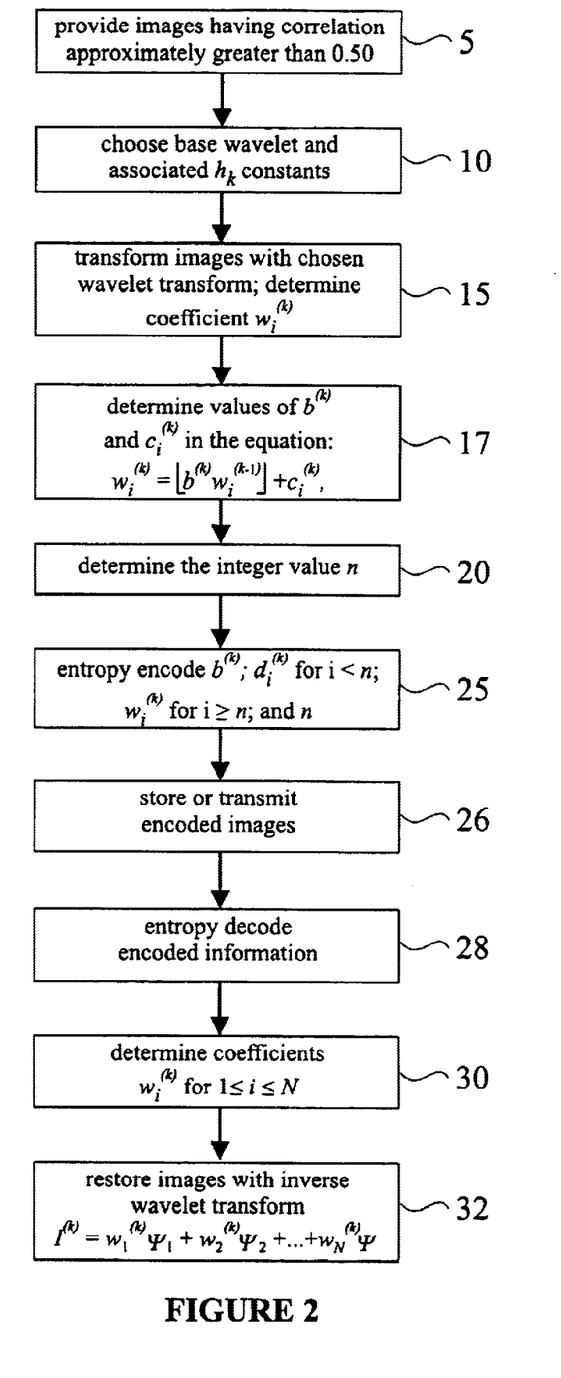
FIG. 2 is a flowchart disclosing the general steps carried out by the method of the present invention.

The general steps for carrying out the method of the present invention are illustrated by the flow chart of FIG. 2. The first two steps, illustrated as 5 and 10 in FIG. 2, represent preliminary information which must be obtained before a radiological image may be compressed according to the disclosed method. The first step, step 5, consists of providing an acceptable set of radiological images of a particular organ such as the brain or lungs. It is important that the multiple images in the study of the organ have sufficient similarities between one another. For purposes of this invention, the similarities are considered sufficient when the correlation between the images is greater than 0.50. While the brain and lungs are examples of organs with such similarity, there are organs, such as the kidneys, which lack sufficient similarity between multiple images to be suited for the method disclosed herein.

The next step seen in FIG. 2, step 10, is the determination of the mother wavelet $\psi(x)$ defined in eqns. (1a) and (1b). It is necessary to find what constants $h_k$ provide a mother wavelet closely representing the image of the organ being considered. The constants $h_k$ may be determined using sets of organ images from several different individuals. For example, these sets could consist of brain CT studies of 10 individuals or lung X-ray studies of 20 individuals. The number of different individuals whose organ images are considered is not critical. It is only necessary that the number be sufficient that the mother wavelet closely represent the image under consideration. For example, it has been discovered that a previously known mother wavelet (a symlet wavelet) and having the $h_k$ constants (0.2352, 0.5706, 0.3252, −0.0955, −0.0604, 0.0249), will closely represent horizontal brain images.

As indicated in step 15, after determining a mother wavelet closely representing the image of the particular organ, the mother wavelet may be utilized to transform any image of that organ to a form of equation (4). Because radiological studies normally contain multiple images, this equation may be represented by $$I^{(k)}(x) = \sum_{i=1}^{N} w_i^{(k)} \psi_i(x), \quad (5)$$

where different values of k represent separate images in a multi-image radiological study. As suggested by FIG. 1, a first image and a second image in a particular study could be represented by the equations:

$$I^{(1)} = w_1^{(1)}\psi_1 + w_2^{(1)}\psi_2 + \ldots + w_N^{(1)}\psi_N \text{ and} \quad (6)$$

$$I^{(2)} = w_1^{(2)}\psi_1 + w_2^{(2)}\psi_2 + \ldots + w_N^{(2)}\psi_N \quad (7)$$

The wavelet transformation will be applied to all images in the study such that each image is represented by an equation such as (6) and (7).

The coefficients $(w_1^{(k)}, w_2^{(k)}, w_3^{(k)}, \ldots, w_N^{(k)})$ for each image (except a "reference" image for k=1 as explained below) will be manipulated in step 17 of FIG. 2 to further reduce the amount of data needed to represent the images of the study. It has been found that total amount of information needed to represent the set of coefficients $(w_1^{(k)}, w_2^{(k)}, w_3^{(k)}, \ldots, w_N^{(k)})$ may be reduced by representing a given range n of coefficients $w_i^{(k)}$ by the equation:

$$w_i^{(k)} = \lfloor b^{(k)} w_i^{(k-1)} \rfloor + c_i^{(k)}, \quad i < n \quad (8)$$

and allowing $w_i^{(k)}$ to remain unchanged for $i \leq n \leq N$. The operator $\lfloor \ \rfloor$ seen here is the "coefficient precision operator", truncating the value of $b^{(k)} w_i^{(k-1)}$ to the same precision threshold that was originally chosen for $w_i^{(k)}$. Since integer coefficient series are normally used in image compression, the operator $\lfloor \ \rfloor$ will typically be a simple integer truncation operator when dealing with image data. The constant $b^{(k)}$ may either be assumed equal to 1, or a more exact value of $b^{(k)}$ may be found by performing a conventional linear regression technique over the set of $(w_1^{(k)}, w_2^{(k)}, w_3^{(k)}, \ldots, w_N^{(k)})$. Alternatively, a sample of this set may be used in order to reduce the computational load. The term $c_i^{(k)}$ is a value related to the coefficient $w_i^{(k)}$. In the embodiment of the present invention where $b^{(k)}$ equals 1, $c_i^{(k)}$ will equal $d_i^k$, wherein $d_i^k$ is defined as:

$$d_i^k = w_i^{(k)} - w_i^{(k-1)}, \quad i < n \quad (9)$$

Alternatively, if a more exact value of $b^{(k)}$ is found by linear regression, the values for $c_i^{(k)}$ will be defined as:

$$c_i^{(k)} = w_i^{(k)} - \lfloor b^{(k)} w_i^{(k-1)} \rfloor i < n \quad (10)$$

It will be understood that the decision regarding what value of $b^{(k)}$ to utilize is a tradeoff between optimal compression and computational complexity. A value of $b^{(k)}$ found by linear regression will offer optimal compression, but at a cost of additional computing time. Alternatively, setting $b^{(k)}$ equal to 1 will may result in somewhat less compression, but Will reduce computing time. As discussed in greater detail below, the same tradeoff is made in selecting a value of n.

To exemplify the embodiment wherein $b^{(k)}$ is set equal to 1, the present invention will provide a reference image, which may be represented as:

$$I^{(1)} = w_1^{(1)}\psi_1 + w_2^{(1)}\psi_2 + \ldots + w_{n-1}^{(1)}\psi_{n-1} + \ldots + w_N^{(1)}\psi_N$$

and an adjacent image represented by:

$$I^{(2)} = w_1^{(2)}\psi_1 + w_2^{(2)}\psi_2 + \ldots + w_{n-1}^{(2)}\psi_{n-1} + \ldots + w_N^{(2)}\psi_N$$

Since the value of $b^{(k)}$ has been set equal to 1, the difference coefficients $(d_1^{(2)}, d_2^{(2)}, \ldots, d_{n-1}^{(2)})$ are determined by taking the differences of $w_i^{(2)} - w_i^{(1)}$ for all integers i between 1 and n−1. The coefficients $(w_1^{(2)}, W_2^{(2)}, \ldots, w_{n-1}^{(2)})$ will be represented by values determined from eqn. (8) with $(c_1^{(2)}, c_2^{(2)}, \ldots, c_{n-1}^{(2)})$ being replaced with $(d_1^{(2)}, d_2^{(2)}, \ldots, d_{n-1}^{(2)})$, while the coefficients $(w_n^{(2)}, w_{n+1}^{(2)}, w_N^2)$ will remain unchanged. It will be understood that the difference coefficients $(d_1^{(2)}, d_2^{(2)}, \ldots, d_{n-1}^{(2)})$ are more likely to be small in absolute value because of the similarity of images $I^{(1)}$ and $I^{(2)}$ (and thus the resulting similarity between $w_i^{(1)}$ and $w_i^{(2)}$). In fact, many of these values will be equal to zero. Therefore, the difference coefficients can be represented with less data upon entropy encoding than the corresponding wavelet coefficients.

Naturally, the above two images and all other adjacent images in the study may be represented more generally by the equations:

$$I^{(k-1)} = w_1^{(k-1)}\psi_1 + w_2^{(k-1)}\psi_2 + \ldots + w_N^{(k-1)}\psi_N, \text{ and} \quad (11)$$

The difference coefficients are then more generally represented by $(d_1^{(k)}, d_2^{(k)}, \ldots, d_{n-1}^{(k)})$ derived from the differences of $w_i^{(k)} - w_i^{(k-1)}$ for all integers i between 1 and n−1. As above, the coefficients $(c_1^{(k)}, c_2^{(k)}, \ldots, c_{n-1}^{(k)})$ will be replaced with $(d_1^{(k)}, d_2^{(k)}, \ldots, d_{n-1}^{(k)})$, while the coefficients $(w_n^{(k)}, w_{n+1}^{(k)}, \ldots, w_N^{(k)})$ remain unchanged.

To determine the number of coefficients $w_i^{(k)}$ which will be replaced by $c_i^{(k)}$, the method requires a determination of the integer n as indicated in step 20. The integer n is a value related to the number of coefficients $w_i^{(k)}$ for which the information in $w_i^{(k)} - w_i^{(k-1)}$ can be more compactly represented than the information in $w_i^{(k)}$. As discussed above, the lower values of i in the series $w_i^{(k)}$ (1<i <N) represent lower spatial frequency information while the higher values i in the series of $w_i^{(k)}$ represent higher spatial frequency information. Thus, the value for $w_i^{(k)} - w_i^{(k-1)}$ will generally vary more as i increases. Therefore, at some point i=n, $w_i^{(k)}$ can be represented with less information than required for $w_i^{(k)} - w_i^{(k-1)}$. While there may be many possible methods for determining the value of n, three methods are disclosed herein. These methods vary in complexity and therefore would vary in the amount of computing time required to calculate n. The first method simply comprises choosing n to be some percentage of N. While n could be set equal to N (i.e. n=(1.00)*N), it is believed it will be more efficient to chose a percentage such as 25% of the total number of coefficients N (i.e. n=(0.25)*N). Naturally, the preferred percentage of N could vary depending on the images being compared. However, n should always be equal to at least one for eqn. (8) to be valid.

Figure 3A:
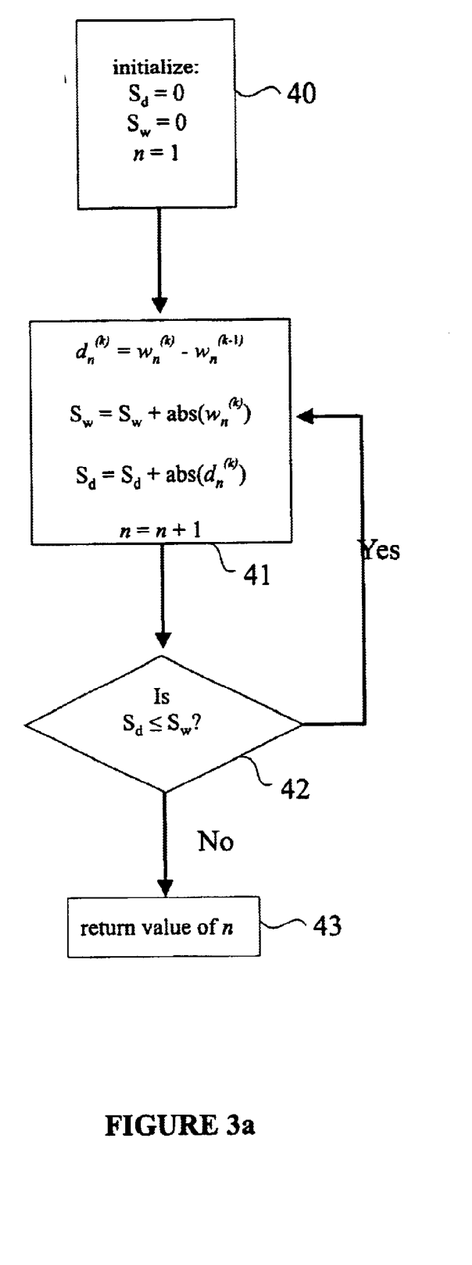
FIGS. 3a and 3b are flowcharts disclosing two methods of determining the value n used in the present invention.

The second method, which is illustrated in FIG. 3a, is determining n based on a comparison of the sum $S_d$ of the first n absolute differences $abs(d_i^{(k)})$, to the sum $S_w$ of the first n absolute wavelet coefficients $abs(w_i^{(k)})$. FIG. 3a shows a first step 40 in which $S_d$ and $S_w$ are initialized to zero while n is initialized to one. In step 41, a value for $d_i^{(k)}$ is computed, the sum $S_d$ of the absolute difference coefficients is computed, the sum $S_w$ of the absolute wavelet coefficients abs($w_i^{(k)}$) is computed, and n is incremented by one. In step 42, a comparison is made to determine whether $S_d < S_w$. If yes, steps 41 and 42 are repeated. When the condition $S_d < S_w$ is not met, step 43 returns the value of n. The n at which $S_d$ is greater than $S_w$ will be the value of n used in equation (9).

Figure 3B:
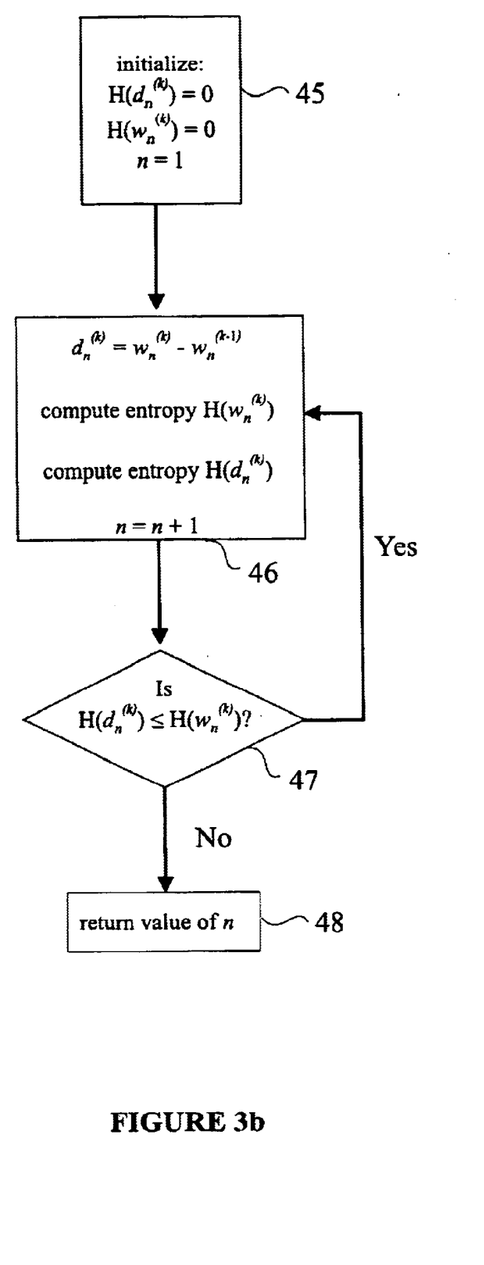

The third method would determine n based on comparing the entropy $H(d_n^{(k)})$ to the entropy $H(w_n^{(k)})$. $H(d_n^k)$ represents the Shannon entropy of the sequence of coefficients $(d_1^{(k)}, d_2^{(k)}, \ldots, d_n^{(k)})$ and $H(w_n^{(k)})$ represents the Shannon entropy of the sequence of coefficients $(w_1^{(k)}, w_2^{(k)}, \ldots, w_n^{(k)})$ FIG. 3b shows a first step 45 in which $H(d_n^{(k)})$ and $H(w_n^{(k)})$ are initialized to zero while n is initialized to one. In step 46, a value for $d_n^{(k)}$ is computed, the entropy $H(d_n^{(k)})$ of the first n difference coefficients $(d_1^{(k)}, d_2^{(k)}, \ldots, d_n^{(k)})$ is computed, the entropy $H(w_n^{(k)})$ of the first n wavelet coefficients $(w_1^{(k)}, w_2^{(k)}, \ldots, w_n^{(k)})$ is computed, and n is incremented by one. In step 47, a comparison is made to determine whether $H(d_n^{(k)}) \leq H(w_n^{(k)})$. If yes, steps 46 and 47 are repeated. When the condition $H(d_n^{(k)}) \leq H(w_n^{(k)})$ is not met, step 48 returns the value of n. The n at which $H(d_n^{(k)})$ is greater than $H(w_n^{(k)})$ is the value of n used in equation (9).

It will be understood that a value of n will be determined for each image in the radiological study. Determining n as a fixed percentage of N will require the least computational time, but probably will not provide the optimal compression. Alternatively, the entropy comparison method provides the value of n optimizing compression, but does so at the expense of computational time. It can be seen determining $b^{(k)}$ by linear regression and the value of n by entropy comparison will be the most computationally intensive embodiment disclosed. On the other hand, assuming $b^{(k)}$ to equal 1 and n to equal (0.25)*N will be the least computationally intensive embodiment disclosed.

After performing the operations described above, each k-th image subsequent to the reference image may be represented by the constant $b^{(k)}$, the difference $(d_1^{(k)}, d_2^{(k)}, \ldots, d_{n-1}^{(k)})$ from the previous image number k-1, the higher wavelet coefficients $(w_n^{(k)}, w_{n+1}^{(k)}, \ldots, w_N^{(k)})$, and the value of n. The amount of information required to represent these values can be further reduced by entropy encoding the values as suggested in step 25 of FIG. 2 with a well know entropy encoding technique such as Huffman or Arithmetic coding. To incorporate all data needed to represent all images in the radiological study, it is necessary to encode the difference coefficients and higher wavelet coefficients for each non-reference image (i.e. k>1) and the entire set of wavelet coefficients for the reference image (i.e. k=1).

As mentioned above, the invention will produce a set of difference coefficients $(d_1^{(k)}, d_2^{(k)}, \ldots, d_{n-1}^{(k)})$ for all images in the study except for the "reference" image. The reference image is a particular image in the study for which the entire set of wavelet coefficients $(w_1^{(1)}, w_2^{(1)}, \ldots, w_N^{(1)})$ will be preserved and transmitted any time there is a transfer of the compressed image data. For purposes of explanation, let it be assumed that the first image in the study is the reference image. It will be understood that the reference coefficients $(w_1^{(1)}, w_2^{(1)}, \ldots, w_N^{(1)})$ will be needed to reconstruct the wavelet coefficients $(w_1^{(2)}, w_2^{(2)}, \ldots, w_{n-1}^{(2)})$ of the adjacent image from the difference coefficients $(d_1^{(2)}, d_2^{(2)}, \ldots, d_{n-1}^{(2)})$ since these values are derived from the equation $d_i^{(2)} = w_i^{(2)} - w_i^{(1)}$. Once the values of $(w_1^{(2)}, w_2^{(2)}, \ldots, w_{n-1}^{(2)})$ are determined, these may be used to determine $(w_1^{(3)}, w_2^{(3)}, \ldots, w_{n-1}^{(3)})$ from $(d_1^{(3)}, d_2^{(3)}, \ldots, d_{n-1}^{(3)})$ and the sequence continued until the wavelet coefficients $(w_1^{(k)}, w_2^{(k)}, \ldots, w_{n-1}^{(k)})$ for all images have been reconstructed. Of course, it is not necessary that the first image in the set be considered the reference image. The term k as used herein corresponds to the order of compression, not the order in which images appear in the set. Any image in the set could be the reference image (k=1) and act as the starting point for the sequence of recovering wavelet coefficients from the difference coefficients and the wavelet coefficients of an adjacent image.

After being entropy encoded, the compressed image data is ready to be stored or transmitted as indicated by step 26 in FIG. 2. Upon retrieval from storage or receipt through transmission of the compressed data, the reverse of the compression process described above is carried out to recover the original image data. First the compressed image data is entropy decoded as seen in step 28 by techniques well known in the art. Next, the wavelet coefficients $(w_1^{(k)}, w_2^{(k)}, \ldots, w_{n-1}^{(k)})$ are determined from the difference coefficients $(d_1^{(k)}, d_2^{(k)}, \ldots, d_{n-1}^{(k)})$ and the adjacent image wavelet coefficients $(w_1^{(k-1)}, w_2^{(k-1)}, \ldots, w_{n-1}^{(k-1)})$. These wavelet coefficients, together with the wavelet coefficients $(w_n^{(k)}, w_{n+1}^{(k)}, \ldots, w_N^{(k)})$ will reconstitute the image in the wavelet eqn. (12):

$$I^{(k)} = w_1^{(k)}\psi_1 + w_2^{(k)}\psi_2 + \ldots + w_N^{(k)}\psi_N,$$

Finally, the inverse wavelet transformation is performed on this equation to obtain the original image as suggested by step 32. Given the mother wavelet, the inverse wavelet transformation of $I^{(k)}$ may be carried out by conventional computational software such as the MATLAB® software disclosed above.

EXAMPLE

To further describe the invention, the following example illustrates one embodiment of the method of the present invention operating upon a set of radiological images. The method was carried out by initially providing approximately 10 CT brain scan studies of different individuals. Each study consisted of 20 to 100 horizontal images or slices of the brain. It was found that the images had a correlation ranging from 0.65 to 0.85. A mother wavelet having $h_k$ constants of (0.2352, 0.5706, 0.3252, −0.0955, −0.0604, 0.0249), was used to decompose the images and obtain the wavelet coefficients $(w_1^{(k)}, w_2^{(k)}, \ldots, w_N^{(k)})$ for each image. The value of n was determined by estimating n to be equal to 25% of N as described above. The value of $b^{(k)}$ was set equal to 1. The difference coefficients $(d_1^{(k)}, d_2^{(k)}, \ldots, d_{n-1}^{(k)})$, the coefficients $(w_n^{(k)}, w_{n+1}^{(k)}, \ldots, w_N^{(k)})$, and the value of n, along with all coefficients of the reference image, were then Huffman encoded. The compressed data for all images in a study were considered a compressed data set. The compressed sets of data were then compared to the data resulting from the same studies being compressed with the standard JPEG compression program. It was determined that the compression method of the present invention resulted in up to 20% greater compression ratio than compression accomplished with lossless JPEG, which is the present standard for medical image encoding.

Appendix A includes a program written using the MATLAB® software and carrying out lone embodiment of the present invention. In the program, n is set equal to 100% of N and the value of $b^{(k)}$ was determined using a linear regression technique. While this program only explicitly carries out one embodiment of the present invention, those of ordinary skill in the art will be able to readily adapt the program to any of the other embodiments disclosed herein.

While the invention was described above in terms of a method, the invention may naturally be practiced as a system or an apparatus. Each of the method steps previously described may be carried out by conventional computer circuitry operating on software which implements the various method steps. Alternatively, the steps could be implemented into integrated circuitry by any conventional digital logic technique or a Very Large Scale Integration (VLSI) technique. Such a system can be represented schematically by the general series of circuits and other components seen in FIG. 4.

Figure 4:
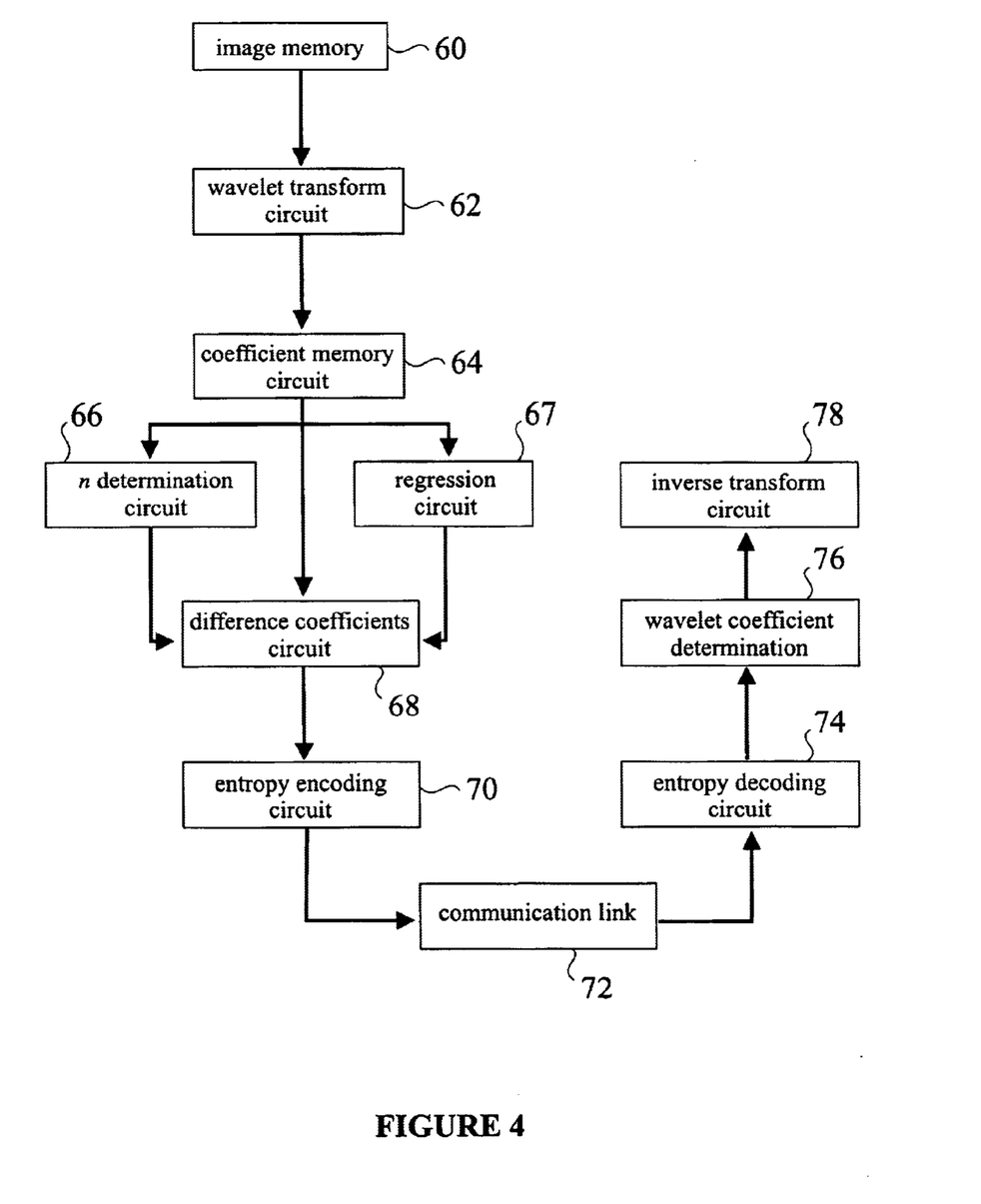
FIG. 4 is a general circuit schematic of an apparatus carrying out the functions of the present invention.

FIG. 4 first shows an image memory circuit 60. Digital data representing radiological images will be stored in memory circuit 60 prior to being operated upon by wavelet transformation circuit 62. Wavelet transformation circuit 62 transforms the image data into a wavelet representation, such as $I=w_1\psi_1+w_2\psi_2+\ldots+w_N\psi_N$. The wavelet coefficients $(w_1, w_2, \ldots, w_N)$ may be stored in a coefficient memory circuit 64 as seen in FIG. 4. The wavelet coefficient data will then be operated upon by circuit 66 to determine a value of n. Circuit 66 may implement the determination of n based upon: n being some percentage of N; comparing the sum $S_d$ to the sum $S_w$; or comparing the entropy $H(d_n^{(k)})$ to the entropy $H(w_n^{(k)})$. Other methods of determining n based upon the value of i where $d_i^{(k)}$ can be represented more compactly than $w_i^{(k)}$ are intended to come within the scope of the present invention. The value of n generated by circuit 66 will be passed to circuits 68 and 70. A regression circuit 67 may also utilize the wavelet coefficient information and a conventional linear regression algorithm in order to determine the appropriate constant $b^{(k)}$ for use in equation (8).

Circuit 68 is a difference coefficient circuit for computing the values of $d_i^k = w_i^{(k)} - w_i^{(k-1)}$, or $c_i^{(k)} = w_i - \lfloor b^{(k)} w_i^{(k-1)} \rfloor$ as previously described. For purposes of brevity, circuit 68 will be discussed below in terms of $d_i^{(k)}$ (i.e. when $b^{(k)}$ equals one), but it will be understood that what follows applies equally to $c_i^{(k)}$ (when $b^{(k)}$ is not equal to one). Having received the value of n from circuit 66, circuit 68 may compute the difference coefficients $d_i^{(k)}$ to $d_{n-1}^{(k)}$. Normally, difference coefficient circuit 68 will store the values of $d_i^{(k)}$ to $d_{n-1}^{(k)}$ for each non-reference image in memory along with the values of $w_n^{(k)}$ to $w_N^{(k)}$ for each such image. Again, it will be understood that all wavelet coefficients for the reference image will also be stored. Thereafter, an entropy encoding circuit 70 will encode the previously determined values of $b^{(k)}$ (if not equal to one), n, $d_1^{(k)}$ to $d_{n-1}^{(k)}$ and $w_n^{(k)}$ to $w_N^{(k)}$ for each such image (and all the coefficients for the reference image) so as to further reduce the data needed to represent the non-reference images. When the image data has been encoded, the data may be transferred via communication link 72 to the data's intended destination. Such destination could include a memory storage area or the computer of another party who desires to view the compressed images. In the latter situation, communication link 72 could be a conventional modem to modem data transfer link. The party receiving the transmitted data or recovering the data from memory storage will utilize a similar series of circuits to reconstruct the original images. An entropy decoding circuit 74 will decode the data to obtain the coefficient values for the reference image and $b^{(k)}$, n, $d_1^{(k)}$ to $d_{n-1}^{(k)}$, and $w_n^{(k)}$ to $w_N^{(k)}$ for each of the non-reference images. From these values, all wavelet coefficients $w_1^{(k)}$ to $w_N^{(k)}$ for each image may be computed with eqn. (8) to obtain equation (5). Thereafter, equation (5) may be processed by the inverse wavelet transform circuit 78 in order to reconstruct the original image.

While FIG. 4 illustrates a particular arrangement of circuits for implementing the data compression technique of the present invention, any combination of circuitry accomplishing the method steps previously described is intended to come within the scope of the invention. Moreover, while the above described method and apparatus will result in lossless data compression, those skilled in the art will recognize many modifications to the invention which may implement "lossy" compression, i.e. greater compression at the expense of image fidelity. One well-known technique for implementing lossy compression is assigning threshold (i.e. "quantizing") values for the data to be compressed. For example, all coefficients having a value between −1 and 1 would be assigned a value of 0. This and other lossy compression techniques can be easily implemented with different choices of the truncation operator $\lfloor \ \rfloor$ in eqn. (8) and, when applied to the coefficients found by the disclosed method or apparatus, are considered within the scope of this invention.

Finally, it is not intended that this invention be limited to the particular method or apparatus disclosed in the specification. While the images described above were CT scan images, the invention could also be used in conjunction with Magnetic Resonance Imaging (MRI) images, Positron Emission Tomography (PET) images, Ultra-sound images or Direct Radiology images. Nor is the invention limited to images which are generally radiological in nature, but could be used to compress image data from any set of images having the requisite degree of similarity. Thus, it is believed that the present invention is well suited for compressing sets of satellite topography images and it is believed that many other areas of practical application will become apparent to those skilled in the art upon disclosure of the invention. Therefore, the scope of the present invention is intended to include all such variations and modifications as encompassed within the scope of the following claims.

APPENDIX A clc; clear;
% Load to two sample similar MRI images
% Images are taken from the same DICOM series,
% therefore they have the same size [nrow, ncol]
Image1=imread ('\MR\mr6.bmp', 'bmp');
Image2=imread ('\MR\mr7.bmp', 'bmp');
[nrow, ncol] =size (Image1);
imshow (Image1);
% image ([Image1; Image 2]);
% Find original entropy of the images
Eoriginal1=entropy (Image1)
Eoriginal2=entropy (Image2)
% Predict second image from the first (see coefficient prediction below)
np=nrow*ncol;
bi = regress (reshape (double(Image1), np, 1), reshape (double(Image2), np, 1))
ri=double(Image2)-fix(bi*double(Image1));
Eresi=entropy(ri)
CompressionGain=Eresi/Eoriginal2
% Find wavelet transforms of the images. Real implementation
% of the algorithm should use wavelet lifting resulting in]
% integer wavelet coefficients C
[C1, S1] =wavedec2(double(Image1), 8, 'sym4');
[C2, S2] =wavedec2(double(Image2), 8, 'sym4');
% Find entropies of the wavelet coefficients
Ewav1=entropy(C1)
Ewav2=entropy(C2)
% Predict second image coefficients C2 from the first
% image coefficients C1. This can be done in several ways
% starting from simple difference C2 = C1+r and going up
% to the most general linear regression C2 = b*C1+r.

APPENDIX A-continued

```
% Regression is used below.
[nr, nc] = size(C1); np=nr*nc;
bw = regress (reshape(fix(C2), np, 1), reshape (fix(C1), np, 1))
rw=fix(C2-fix(bw*C1));
Eresw=entropy (rw)
CompressionGain=Eresw/Ewav2
% Reconstruct the images, using predicted coefficients
% C2' = fix(bw*C1) +rw  instead  of  C2
% for the second image
ImageRec1=waverec2(C1, S1, 'sym4');
ImageRec2=waverec2(fix(bw*C1) +rw, S2 'sym4');
% Perfect reconstruction check
max ( max(double(Image1)-ImageRec1)), max(max(double(Image2)-
ImageRec2)) )
% Compute Shannon entropy of a 2D matrix X (i.e., image)
% or ID vector (i.e., wavelet coefficients)
function e = entropy (X)
Y=double (X);
[nr, nc] size(Y);
Vec = reshape (Y, nr*nc, 1);
% 1. Find matrix histogram
maxlevels = max(max(Vec));
range=1:maxlevels;
[counts values] = hist (Vec, range);
total = sum(counts) ;
percents = 100*counts./total;
tmp = [values; counts; percents]';
if nargout == 0
    [m,n] = size(tmp);
    s = 37;
    s = s(ones(m,1), :);
    disp(' Value   Count   Percent');
    fprintf(1, ' %5d   %5d   %6.2f%c\n', [tmp'; s']);
else
    table = tmp;
end
% 2. Compute entropy from frequencies
Freq=nonzeros (table(:, 3)/100);
e=sum(-Freq .* log2(Freq) );
```

The invention claimed is:

1. A method of compressing image data comprising the steps of:

a) Providing data representing a set of individual images, said set of images having a correlation greater than 0.5;

b) Applying a wavelet transform to a reference image of said set to determine a series of coefficients $w_i^{(1)}$ related to said reference image, wherein said reference image may be any image in said set;

c) Applying a wavelet transform to remaining images of said set to determine a series of coefficients $w_i^{(k)}$ for k>1 related to said remaining images;

d) Comparing the series of coefficients $w_i^{(k-1)}$ and $w_i^{(k)}$, for k>1 to determine a further coefficient, $c_i^{(k)}$, such that $w_i^{(k)}$ is determined from the relationship:

$$w_i^{(k)} = \lfloor b^{(k)} w_i^{(k-1)} \rfloor + c_i^{(k)},$$

e) Entropy encoding said coefficients $w_i^{(1)}$, $c_i^{(k)}$ for k>1 and thereby forming a compressed set of image data.

2. A method of compressing image data according to claim 1, wherein the coefficient $b^{(k)}$ is determined by a linear regression analysis of the set of coefficients ($w_1^{(k)}$, $w_2^{(k)}$, $w_3^{(k)}$, ..., $w_N^{(k)}$).

3. A method of compressing image data according to claim 1, wherein said images have a correlation of between 0.5 and 0.9.

4. A method of compressing image data according to claim 1, wherein said wavelet transform is represented by:

$$\phi(x) = \sum_m q_m \phi(2x - m),$$

$$\psi(x) = \sum_m h_m \phi(2x - m),$$

and where $h_m$ is the series of constants (0.2352, 0.5706, 0.3252, −0.0955, −0.0604, 0.0249).

5. A method of compressing image data according to claim 1, wherein said coefficient $b^{(k)}$ equals one and said coefficient $c_i^{(k)}$ equals the coefficient $d_i^{(k)}$, wherein $d_i^{(k)}$ is the difference between $w_i^{(k)}$ and $w_i^{(k-1)}$.

6). A method of compressing image data according to claim 5, wherein said coefficient $c_i^{(k)}$ is equal to the coefficient $d_i^{(k)}$, for i=1 to n−1, and $w_i^{(k)}$ is unchanged for all remaining values of i.

7. A method of compressing image data according to claim 6, wherein the value n equals 25% of the total number of wavelets N representing the image.

8. A method of compressing image data according to claim 6, wherein the value n is determined by comparing the absolute sum of coefficients $w_i^{(k)}$ to the absolute sum of differences $d_i^{(k)}$.

9. A method of compressing image data according to claim 6, wherein the value n is determined by comparing the entropy of coefficients $w_i^{(k)}$ to the entropy of differences $d_i^{(k)}$.

10. A method of compressing image data according to claim 1, wherein said set of images comprises radiological images.

11. An apparatus for compressing image data comprising:

a) A memory circuit capable of storing data representing a set of images;

b) A wavelet transformation circuit capable of transforming each of said images of said set in said memory circuit into a series of wavelet coefficients $w_i^{(k)}$ derived from said images, including a reference image $w_i^{(1)}$ which may be any image in said set;

c) A difference coefficient circuit capable of determining a series of difference coefficients $d_i^{(k)}$ by subtracting a wavelet coefficient $w_i^{(k-1)}$ from an adjacent wavelet coefficient $w_i^{(k)}$;

d) A circuit capable of determining a value n such that $d_i^{(k)}$ is determined for all values of $1 \leq i \leq n$; and e) An entropy encoding circuit capable of encoding said coefficients $w_i^{(1)}$ for all i, $d_i^{(k)}$ for $1 \leq i \leq n$ and $w_i^{(k)}$ for $n \leq i \leq N$ for k>1, thereby forming a compressed set of image data.

12. An apparatus for compressing image data according to claim 11, wherein said wavelet transformation circuit implements the transform represented by:

$$\phi(x) = \sum_m q_m \phi(2x - m),$$

$$\psi(x) = \sum_m h_m \phi(2x - m),$$

and where $h_m$ is the series of constants (0.2352, 0.5706, 0.3252, −0.0955, −0.0604, 0.0249).

13. An apparatus for compressing image data according to claim 11, wherein said circuit for determining the value n sets n equal to 25% of the total number of elements N comprising the image.

14. An apparatus for compressing image data according to claim 11, wherein said circuit for determining the value n computes n by comparing the absolute sum of coefficients $w_i^{(k)}$ to the absolute sum of differences $d_i^{(k)}$.

15. An apparatus for compressing image data according to claim 11, wherein said circuit for determining the value n computes n by comparing the entropy of coefficients $w_i^{(k)}$ to the entropy of differences $d_i^{(k)}$.

16. An apparatus for compressing image data comprising:
   a) A computer means for processing data;
   b) A means for storing data representing a set of images;
   c) A means for wavelet transforming each of said images of said set in said means for storing into a series of wavelet coefficients $w_i^{(k)}$ derived from said images, including a reference image $w_i^{(1)}$ which may be any image in said set;
   d) A means for determining a series of differences coefficient $d_i^{(k)}$ by subtracting a first wavelet coefficient series $w_i^{(k-1)}$ from a second wavelet coefficient series $w_i^{(k)}$;
   e) A means for determining a value n such that $d_i^{(k)}$ is determined for all values of $1 \leq i \leq n$; and
   f) A means for entropy encoding said coefficients $w_{i(1)}$ for all i, $d_i^{(k)}$ for $1 \leq i < n$ and $w_i^{(k)}$ for $n \leq i \leq N$ for k>1, thereby forming a compressed set of image data.

17. A method of compressing image data according to claim 1, wherein said set of individual images includes a first image in said set and said reference image coefficients $w_i^{(1)}$ are derived from said first image.

18. A method of compressing image data according to claim 1, wherein said set of individual images includes a plurality of images and said reference image coefficients $w_i^{(1)}$ are derived from one of said plurality of images other than a first image in said set.

* * * * *